United States Patent

[11] 3,591,790

[72] Inventor John H. Couture
80 Hadley Road, South Burlington, Vt. 05401

[21] Appl. No. 727,299
[22] Filed May 7, 1968
[45] Patented July 6, 1971

[54] COMPUTER DEVICE WITH INTERCHANGEABLE PARAMETER SCALING
19 Claims, 3 Drawing Figs.

[52] U.S. Cl. .......... 235/193, 235/184, 324/115
[51] Int. Cl. .......... G06g 7/48
[50] Field of Search .......... 235/193, 184, 132; 33/111, 113; 35/9, 19.1, 24.2; 324/115; 179/6.3—7, 7.1, 90

[56] References Cited
UNITED STATES PATENTS

| | | | |
|---|---|---|---|
| 1,860,895 | 5/1932 | Marx .......... | 35/9 |
| 3,018,050 | 1/1962 | Barrell .......... | 235/193 |
| 3,050,682 | 8/1962 | Szymczak et al. .......... | 324/115 |
| 3,270,190 | 8/1966 | Lambert .......... | 235/194 |
| 3,406,281 | 10/1968 | Buchanan et al. .......... | 235/193 |

*Primary Examiner*—Malcolm A. Morrison
*Assistant Examiner*—Joseph F. Ruggiero
*Attorney*—LeBlanc and Shur

ABSTRACT: There is disclosed herein a portable electronic computer device of simplified construction and low cost useful to solve a wide range of engineering and other mathematical problems. The device includes an operational amplifier connected as a summer and related input circuitry including input potentiometers, and reciprocal and scale-expanding or multiplier switches together with a series of removable interchangeable parameter scale cards designed to provide proper scaling and interrelationship for a plurality of dependent and independent variables in a wide range of problems.

PATENTED JUL 6 1971

3,591,790

SHEET 1 OF 2

INVENTOR
JOHN H. COUTURE

BY Le Blanc & Shur

ATTORNEYS

INVENTOR
JOHN H. COUTURE

BY Le Blanc & Shur
ATTORNEYS

COMPUTER DEVICE WITH INTERCHANGEABLE PARAMETER SCALING

The present invention relates to an electronic computing device. Among the features of this device are simplified design, small size and low cost, coupled with the capacity for use in solving a wide range of technical and other mathematical problems by a relatively unskilled person. In operation, an equation is solved by adjusting a plurality of independent and dependent variable analog voltages to balance the two sides of the equation. The computer of this invention can be operated as an analog adder, or logarithmically to provide multiplication and division. Moreover, the device may be used to generate various nonlinear and transcendental functions such as exponential and trigonometric functions or other functions, with no difficulty, and yet is of low cost, simple in construction and operation. The result is a convenient, portable computer which may be used as a highly versatile substitute for a slide rule and table of constants and conversion factors.

The foregoing results are accomplished by employment of an analog computing device including an operational amplifier with resistive feedback and related input circuitry. Any desired number of problem-variables are provided for by including a sufficient number of amplifier inputs. A battery and precision potentiometer provide each of the problem-variable analogs. A series of removable interchangeable parameter scale cards, each pertaining to a particular set of problem-variables, serve as dial scales and conversion factor memories for the problem-variable potentiometers. This permits proper scaling and solution of several problems involving relationships between a set of parameters associated with each card. The potentiometers operate with signal inverted switches to permit subtraction or division on a logarithmic basis (in effect, transfer of a variable from one side of an equation to the other).

The device is equipped with a scale extending multiplier to accommodate the expected ranges and proper parameter interrelationships for the set of problems to be solved with a given scaling card. Generation of powers and roots is also provided for by suitable switching.

The computer includes balancing circuitry which makes possible precision setting of independent variables and measurement of dependent variables with simplified and inexpensive circuitry and components. The balancing circuitry reduces inherent difficulties of potentiometer end tolerance and calibration to compensate for small fluctuations of reference and power source outputs in long term use.

Accordingly, it is an object of this invention to provide a new and improved electronic computing device.

It is another object of this invention to provide a portable electronic computer device which is capable of solving a wide variety of mathematical problems and yet is simple and inexpensive in construction.

It is also an object of this invention to provide an electronic computing device capable of solving a variety of mathematical problems by the use of a plurality of removable interchangeable parameter scale cards, having indicia providing scaling for a plurality of independent and dependent variables.

It is another object of this invention to provide a new and improved portable electronic computing device including an analog computer amplifier and a plurality of removable interchangeable parameter scale cards to represent a wide variety of mathematical operations and problems.

It is an additional object of this invention to provide an electronic computing device as described above including a DC amplifier with resistive feedback, a plurality of potentiometer inputs, voltage reference sources, input switches, and balancing circuitry and a plurality of removable interchangeable parameter scale cards serving as potentiometer dial scales to permit representation of a wide variety of mathematical functions and operations, and to facilitate the solution of a wide range of mathematical problems.

The exact nature of this invention, together with other objects and advantages thereof, will be apparent from consideration of the following detailed description and accompanying drawing, wherein.

Figure 1:
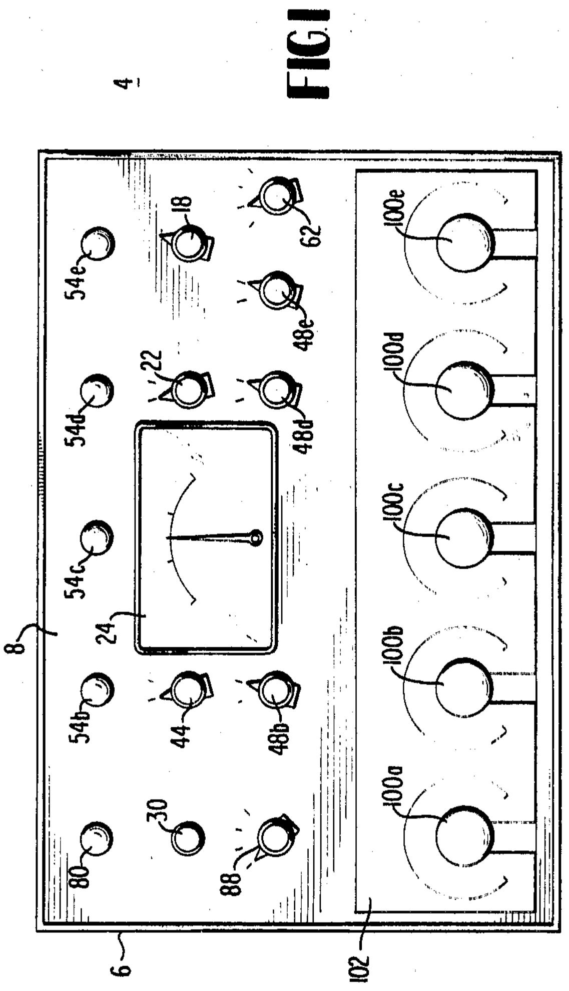
FIG. 1 represents a front elevation typifying the external arrangement of an electronic computing device in accordance with this invention.

Referring now to FIG. 1, the new and improved computing device of this invention, generally denoted at 4, is adapted to be housed in an outer case 6, preferably sufficiently small to permit convenient portability. As an example, one embodiment of this device has been constructed of such size as to fit conveniently into a conventional attaché case. The entire device may be mounted on the back side of a suitable faceplate 8 within outer case 6. Various potentiometer shafts and switches protrude through openings in plate 8 to permit convenient operation as detailed hereinafter.

Figure 2:
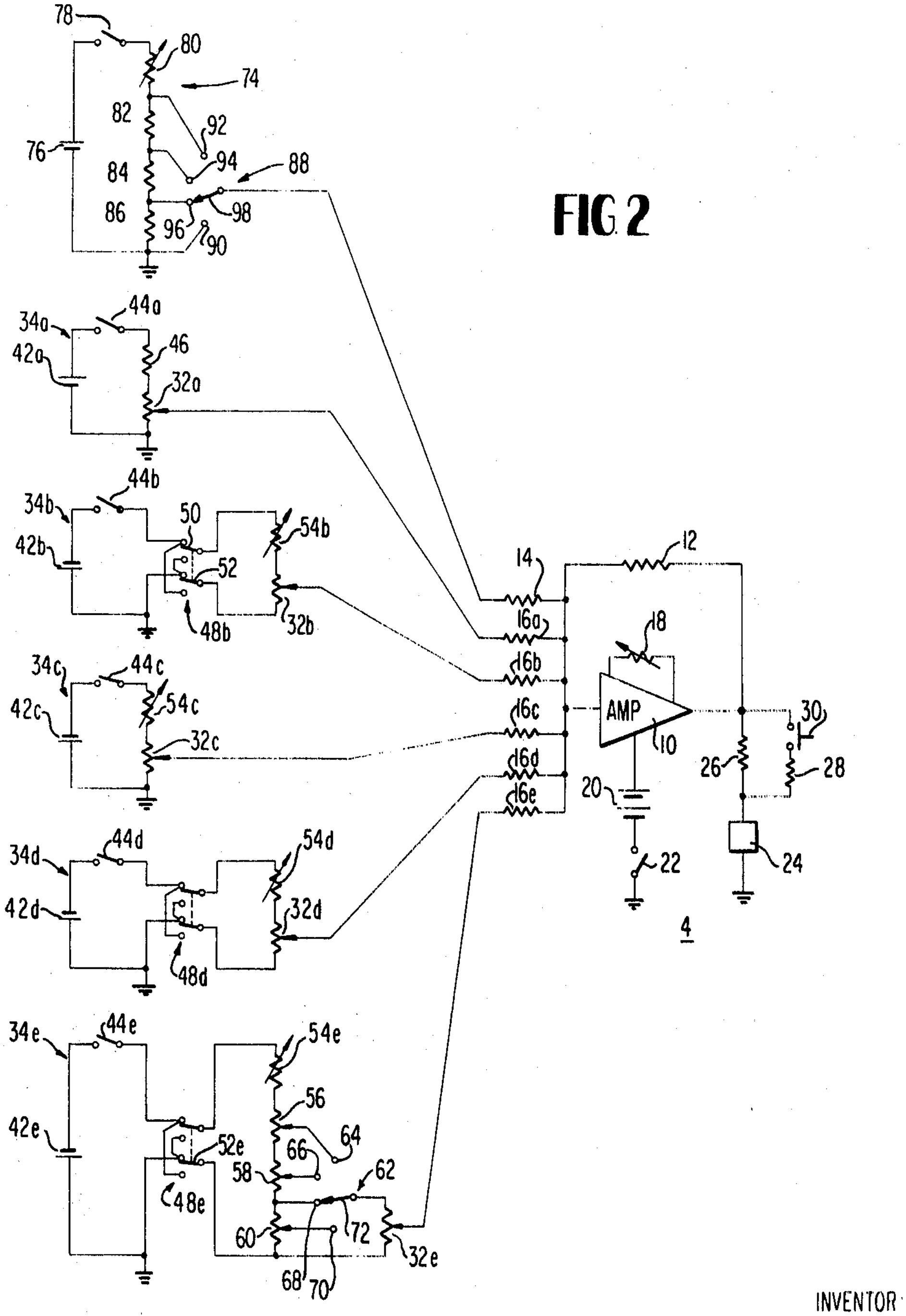
FIG. 2 is an electrical schematic diagram showing the construction of a suitable computing device in accordance with this invention.

With additional reference now to FIG. 2, there is shown a circuit diagram for one form of an electronic computing device in accordance with this invention. Included are an operational amplifier 10, a feedback resistor 12, and a plurality of input summing resistors including a scale multiplier summing resistor 14, and problem variable summing resistors *16a* through *16e*. Also associated with operational amplifier 10 are an output balancing potentiometer 18, a power supply 20, and a power switch 22. The output of amplifier 10 is connected to an output meter 24 through a series meter resistor 26. An additional resistor 28 is connected in parallel with meter resistor 26 through a normally open momentary contact switch 30. This greatly reduces the meter series resistance when switch 30 is depressed. This increases meter sensitivity for calibration or final fine adjustment of the problem solution as explained more fully below.

Operational amplifier 10 may be of any desired type. Numerous commercially available devices are suitable but a battery operated transistor amplifier operating in the 1—10 volt range is preferred.

Both the independent variables and the problem solution are manually set on separate problem variable potentiometers *32a* through *32e*, included in a plurality of input circuits generally denoted as *34a* through *34e* in FIG. 2. In addition to potentiometers *32a* through *32e*, input circuits *34a* through *34e* also include combinations of batteries, switches and variable and fixed resistors, to provide signal inversion, scaling and calibration functions necessary for satisfactory computer operation. Input circuits *34a* through *34c* may include various combinations of the features described hereinafter but it has been found that for an extremely large class of important engineering problems, a construction in the particular form illustrated and described provides great operational flexibility and utility. Further, while five input circuits are illustrated, it should be appreciated that a larger or smaller number may be provided depending upon the number of problem variables to be accommodated and the degree of operational flexibility desired.

Input circuit *34a* includes a first 1.5 volt battery *42a* having its negative terminal connected to ground and its positive terminal connected to a fixed contact of a problem-variable selector switch *44a*. Other battery voltages may, of course, be used, but 1.5 volts is especially convenient since it can be provided by ordinary pencil-type flashlight batteries. A series circuit including a fixed calibrating resistor 46 and the problem-variable potentiometer *32a* for a first problem-variable is connected between the other contact of switch *44a* and ground. The arm of potentiometer *32a* is connected to problem-variable summing resistor *16a*.

Input circuit 34*b* includes a second 1.5 volt battery 42*b* having its positive terminal grounded and its negative terminal connected to the fixed contact of a second problem-variable selector switch 44*b*. The movable contact of problem-variable selector switch 44*b* is connected to a polarity inversion or reciprocal switch 48*b* which permits selection of the polarity of the battery voltage connected to the remainder of input circuit 34*b*. As illustrated, reciprocal switch 48*b* is a double pole two-position switch but alternative arrangements may be substituted. The first position of the first pole is directly wired to the second position of the second pole while the first position of the second pole is directly wired to the second position of the first pole. Accordingly, when mechanically coupled arms 50*a* and 52*a* of switch 48*b* are in the position shown, i.e., the first position, a negative voltage appears between arms 50*b* and 52*b*, while placement of the switch in the second position results in a positive voltage between arms 50*b* and 52*b*.

A series circuit including a calibration potentiometer 54 and the problem-variable setting potentiometer 32*b* for the second variable is connected between switch arms 50*b* and 52*b* so that movement of switch 48*b* from the first to the second position has the effect of inverting the polarity of the voltage established across the problem-variable setting potentiometer 32*b*. A portion of the voltage as determined by the setting of the potentiometer is fed to amplifier 10 through problem variable summing resistor 16*b*.

It should be noted that battery 42*b*, and also batteries 42*c* and 42*e* associated with input circuits 34*c* through 34*e* are all connected in opposite polarity to that of battery 42*a* in first input circuit 34*a*. This permits establishment of the first variable as the dependent variable, and mechanization of problem solution with the independent variables conceptually on one side of the equation and the dependent variables on the other side of the equation. Thus, the desired values for the independent variables are set by input circuits 34*b* through 34*e* and the value of the dependent variable is adjusted until its value is equal to the combined values of the independent variables. The polarity opposition between the independent and dependent variables permits this to be done conveniently since an amplifier output null and corresponding zero reading on meter 24 are produced when the problem solution is attained.

Input circuit 34*c* includes a third 1.5 volt battery 42*c* grounded at its positive terminal and connected at its negative terminal to the fixed contact of a third problem-variable selector switch 44*c*. Connected between the other end of switch 44*c* and ground is a series circuit including a calibration potentiometer 54*c* and the problem-variable setting potentiometer 32*c* for the third variable, the arm of which is connected to amplifier 10 through summing resistor 16*c*. No signal inversion or reciprocal switch such as 48*b* is used for input circuit 34*c* although it should be appreciated that the same could be provided in an arrangement identical to that in input circuit 34*b* if desired.

The construction of input circuit 34*d* is identical to that of input circuit 34*b*. This includes a fourth 1.5 volt battery 42*d*, a problem-variable selector switch 44*d*, a reciprocal switch 48*d* and a series circuit including a calibration potentiometer 54*d* and the problem variable setting potentiometer 32*d* for the fourth variable. The arm of potentiometer 32*d* is connected through summing resistor 16*d* to amplifier 10.

Fifth input circuit 34*e* includes a battery 42*e*, negatively connected from ground to the fixed contact of a fifth problem-variable selector switch 44*e* and a reciprocal switch 48*e* as previously described but also includes additional resistive circuit elements and a selector switch to provide exponential function control for the fifth problem-variable. The resistive circuit includes a calibrating potentiometer 54*e*, and three like potentiometers 56, 58, and 60, connected in series between the two arms 50*e* and 52*e* of reciprocal switch 48*e*. A selector switch 62 has a first fixed contact 64 connected to the arm of potentiometer 58, a third fixed contact 68 connected between potentiometers 58 and 60, and a fourth fixed contact connected to the arm of potentiometer 60. A movable arm 72 of switch 62 is connected to one end of the problem-variable setting potentiometer 32*e* for the fifth variable, the other end of which is returned to the normally positive arm 52*e* of reciprocal switch 48*e*. The arm of problem-variable setting potentiometer 32*e* is connected through input summing resistor 16*e* to amplifier 10.

The exponential scaling circuit shown permits generation of the square, cube and square root of the fifth variable. To this end, battery 42*e* is chosen to provide 4.5 volts (or three 1.5 volt batteries like batteries 42*a* through 42*d* may be used). Potentiometers 54*e*, 56, 58, and 60 are adjusted so that placing arm 72 of switch 62 in the position shown in the drawing, will produce the same voltage across problem-variable potentiometer 32*e* as across the other problem variable potentiometers 32*a* through 32*d*.

When switch arm 72 is positioned on contact 70, the voltage across problem-variable potentiometer 32*e* is exactly half that provided with switch arm 72 resting on contact 68. This produces the square root when logarithmic scales are used for the problem-variable potentiometers. Correspondingly, with switch arm 72 resting on fixed contact 64, a voltage three times that appearing at terminal 68 is provided while connection of arm 72 to fixed contact 66 provides a voltage twice that appearing at terminal 68. This produces the cube and square, respectively, of the fifth variable for logarithmic scaling or alternatively, multiplication by factors of 3 and 2, respectively, for linear scaling. Additional potentiometers and correspondingly increased battery voltage may be employed to permit raising the fifth variable to other integral and/or fractional powers as may be desired for solution of various problems.

Another input to amplifier 10 is provided through summing resistor 14 by a scale multiplier circuit 74 including a 4.5 volt battery 76, grounded at its negative terminal, and connected at its positive terminal to the fixed contact of a selector switch 78. Connected between the other contact of switch 78 and ground is a series circuit including a calibration potentiometer 80 and three fixed scaling resistors 82, 84, and 86. Selector switch 88 has a first fixed contact 90 connected to ground, and additional fixed contacts 92, 94, and 96. Contact 92 is connected between calibration potentiometer 80 and fixed resistor 82, fixed contact 94 is connected between resistors 82 and 84, and fixed contact 96 is connected between resistors 84 and 86. Movable arm 98 of switch 88 is connected through multiplier summing resistor 14 to the input of amplifier 10.

Battery 76 and resistors 80, 82, 84, and 86 in multiplier circuit 74 are chosen to permit addition of integral multiples of the voltage provided across problem-variable potentiometers 32*a* through 32*d* to the input of amplifier 10. Since batteries 76 and 42*a* in input circuit 34*a* are both positively connected with respect to ground, the voltage added to amplifier 10 by multiplier circuit 74 can be regarded conceptually as appearing on the same side of the equation being solved as the first problem-variable. If the problem variables are represented logarithmically, then the voltage added effectively multiplies that side of the equation by integral powers of the full scale value of the first variable, and amounts to a corresponding scale expansion for that variable. As will be recalled, problem solution is obtained by balancing the dependent variable analog voltage against the sum of the analog voltages for the independent variables. In the event that the sum of the independent variable analog voltages exceeds that which can be provided by a single 1.5 volt battery, scale multiplier 74 permits problem solution by increasing the effective value of the dependent variable battery voltage. For the configuration illustrated, with three voltage steps provided in scale multiplier 74, the effective voltage of battery 42*a* may be increased to four times its actual value.

In all of the preceding description, it has been implicitly assumed that suitable dial scales are provided for problem-variable potentiometers 32*a* through 32*e* so that the desired parameter values may be set into the computer. In the present invention, this scaling is actually provided by means of the series of the removable and interchangeable parameter scale cards previously mentioned.

With reference again to FIG. 1, the shafts of problem-variable potentiometers 32*a* through 32*e* project through the face of mounting plate 8 and carry potentiometer adjusting knobs or dials 100*a* through 100*e*, mounted in spaced relationship to the faceplate 8 to permit the placement of a parameter scale card 102 on the faceplate behind the potentiometer dial. A given card 102 provides the proper indicia to serve as the dial scales and variable identifiers for the problem-variables associated with a complete class of problems.

Figure 3:
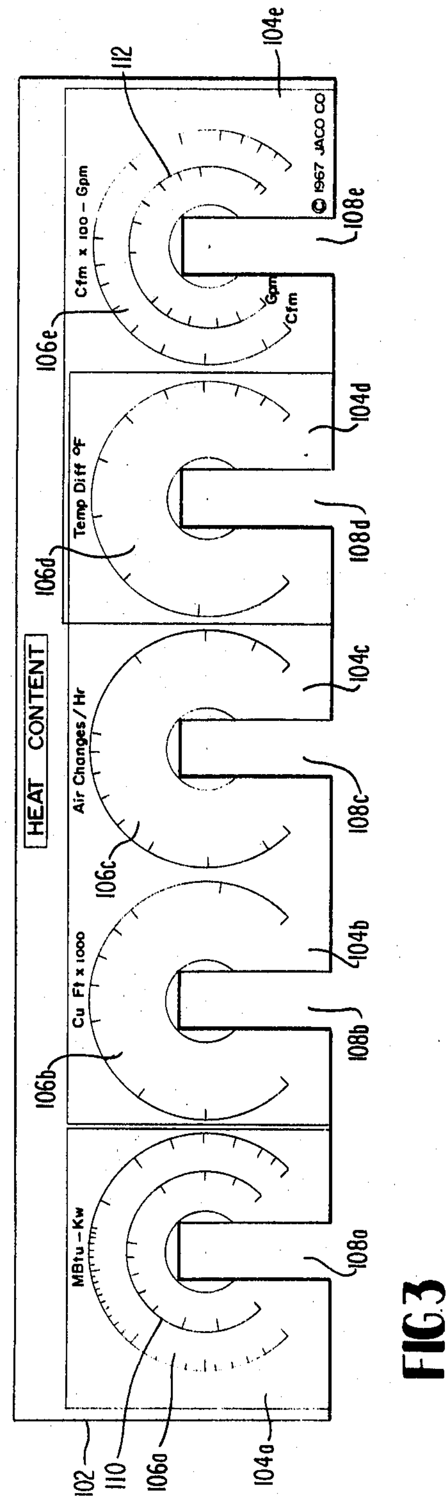
FIG. 3 is an example of a typical interchangeable parameter card for use with the electronic computing device of this invention.

The nature and construction of a particular parameter scale card 102 is shown in FIG. 3. The card is essentially a rectangular plate formed of plastic, cardboard, or other suitable durable material, divided into a plurality of separate areas 104*a* through 104*e*, each corresponding to one problem variable. Each of areas 104*a* through 104*e* includes a series of indicia which form dial scales 106*a* through 106*e*, respectively. These are used to set problem-variable potentiometers 32*a* through 32*e* at the desired values. As shown, each dial scale includes spaced graduations and numerical designations in logarithmic relationship so that algebraic addition of voltages by amplifier 10 provide multiplication and division for the variables. Alternatively, scales 106*a* through 106*e* may be linearly spaced with the result that algebraic addition of voltages by amplifier 10 provide addition and subtraction for the problem-variables.

To provide interchangeability, keyhole slots 108*a* through 108*e* are provided in each of the dial scales. This permits card 102 to be positioned removably on computing device 4 with the shafts of potentiometers 32*a* through 32*e* protruding through the central openings above the respective dial scales. Suitable pointers are provided on the potentiometer dials to permit accurate alignment with the graduations on the dial scales themselves.

The particular card 102 shown in FIG. 3 is intended for use in solution of a variety of air heating and cooling problems. For such problems, pertinent variables include energy or heat content, volume, air changes per hour, desired temperature difference and rate of airflow. The foregoing variables permit solution of problems involving heat to be supplied by a heating system as follows (ignoring for the moment, necessary constants and dimensional consistency):

Problem 1: $H_S=Q\times\Delta T\times c\times p$

Problem 2: $H_S=g\times r\times AFT\times c\times p$ where: $H_S$ = heat to be supplied (B.t.u.); $Q$ = volume of air to be heated per unit of time (c.f.m.); $T$ = Temperature difference (°F.); $q$ = volume to be heated (ft$^3$); $r$ = air circulation (changes/hour); $c$ = specific heat of air at constant temperature; and $p$ = density of air.

For Problems 1 and 2, dial scale 106*a* represents $H_S$, the dependent variable, and is calibrated in units of heat (MB.t.u.). An additional scale 110, concentric with scale 106*a* is calibrated in Kilowatts (kw). Dial scales 106*b* through 106*e* represent the independent variables for Problems 1 and 2. Dial scale 106*b* represents the variable $q$ and is calibrated in units of cubic feet × 1000. Dial scale 106*c* represents the variable $r$, and is calibrated in units of reciprocal time, i.e., air changes/hour. Dial scale 106*d* represents the variable $\Delta T$ in units of (°F.). Dial scale 106*e* represents the variable $Q$ and is calibrated in units of cubic feet/minute (c.f.m.). An additional scale 112, concentric with scale 106*e* is calibrated in units of gallons/minute (g.p.m.). For Problem 1, scales 106*d* and 106*e* are the independent variables; for Problem 2, scales 106*b*, 106*c* and 106*d* are the independent variables. Potentiometers for unused variables are set in the maximum counterclockwise position.

Use of scale 106*e* or 112 as dependent variables permits solution of yet another problem with scale card 102, viz:

Problem 3: $Q=qr$

For this problem, scales 106*b* and 106*c* serve as the independent variables.

In stating Problems 1—3, neither constants nor dimensional consistency have been considered. Obviously, these cannot be ignored if correct solutions for the equations are to be obtained. One way to assure dimensional consistency would be to provide the required conversion factors preliminarily for the independent variables. Required constants could be provided in this manner also. On the other hand, because of the great flexiblity of the concepts of this invention, necessary conversion factors may be built into the scaling cards simply by rotating the dial scales, i.e., by calibrating the scales for the independent variables so that a particular voltage on the arm of the problem-variable potentiometer represents the scale setting multiplied by the desired constant or conversion factor. Thus, for Problem 1, the factor $c\times p$ is ordinarily taken as 0.018 (see Marks'-Mechanical Engineering Handbook, 6th Edition, page 12—76). While the units of $Q$ for $H_S$ in B.t.u. would require a conversion factor of 60. Thus, the proper dimensionally consistent form for Problem 1 is:

$$H_S=60\times0.98\times Q\times\Delta T=1.1Q\,\Delta T$$

Inherent compensation is provided by effective clockwise rotation of scale 106*e* which starts at $1/1.1=0.9$ (c.f.m. × 100) rather than 1.0. In this way, a scale setting of $Q\times1.0$ produces a voltage actually representing $Q'=1.1Q$. Equivalent rotation of scales 106*b* and 106*c* is provided for Problems 1 and 3. Similar scaling is provided by rotation of scales 106*a* and 110 and 106*e* and 112, relative to each other, to provide the conversion factor between scales 106*a* and 110 of 1 MB.t.u. = 0.29 4 kw. and between scales 106*e* and 112 of 100 c.f.m.=0.235 g.p.m.

An additional significant feature of parameter scale card 102 may be seen from consideration of dial scales 106*a* and 104*e*. These scales extend over two decades rather than a single decade as in the case of the other scales. In order to accommodate this, the total voltage which is provided for the first and fifth problem-variable analogs must represent ranges which exceed those for the other variables by a factor of 10. Since the scales are logarithmic, this simply requires that the input voltage for the first and fifth variables be double that available for the others.

In the case of the fifth variable, this is readily provided by switching arm 72 of switch 62 from contact 68 to contact 66 (see FIG. 2) since this automatically doubles the voltage available at the fifth problem variable potentiometer 32*e*. In the case of the first problem variable, this cannot be done since the battery voltage 42*a* is fixed. Here, the required expansion of the scale is accomplished by use of scale multiplier 74 which, as previously mentioned, may be used to increase the effective voltage of battery 42*a*.

From the foregoing, it will be appreciated that in order to obtain scale expansion for other problem variables, either a scale multiplier circuit such as 74, or an exponential scaling circuit such as that associated with fifth input circuit 34*e* should be provided for these variables. In order to assure complete understanding of the construction and operation of this invention, the steps necessary to achieve a solution to Problem 1 will be presented in detail.

First, the amplifier and input circuits must be calibrated in order to assure a fixed relationship between all the independent and dependent variables. Accordingly, amplifier power supply 20 is actuated by closing power supply switch 22. All of input selector switches 78 and 44*a* through 44*e* are set to the "off" position. (For convenience, all the switches may be ganged.) If this is not done, all input potentiometers should be set at maximum counterclockwise position and switch 88 connected to ground contact 90.

Then, amplifier balance potentiometer 18 is adjusted until a null meter reading is obtained. This reading is checked, i.e., fine-adjusted, by depressing meter sensitivity switch 30 and making any necessary final adjustments.

Next, the input circuits are balanced with references to the input circuit for the first variable, i.e., input circuit 34*a*. This is accomplished by setting input selector switches 78 and 44*a* through 44*e* to their "on" positions with the dials for all of problem-variable potentiometers 32*a* through 32*e* at maximum counterclockwise position to represent zero values for all variables. At this time, switch 88 is kept at contact 90.

First variable potentiometer 32a is then moved to the maximum clockwise position on the *dial scale* to produce a substantial deflection of output meter 24. To balance the second input circuit 34b, problem variable potentiometer 32b is set to its full scale position and reciprocal switch 48b is placed in its normal position so that opposite polarities are provided by input circuits 34a and 34b. Balance potentiometer 54b in input circuit 34b is then adjusted to provide a null; fine adjustment is made with sensitivity switch 30 depressed. Once a true null is obtained, problem-variable potentiometer 34b is returned to its rest position. Calibration of input circuits 34c and 34d is accomplished in precisely the same manner as that of input circuit 34b.

The result of the foregoing is to calibrate all of input circuits 34b through 34d with respect to input circuit 34a so that, independent of changes in component values or battery voltage, identical full-scale voltages are provided by the arms of each of product-variable potentiometers 32a through 32d.

Calibration of input circuit 34e proceeds in a slightly different manner from the foregoing due to the presence of the exponential scaling feature in this input circuit. Here, calibration is attained by placing switch arm 72 on contact 64, i.e., corresponding to the $X^3$ function. First variable potentiometer 32a is set to zero while potentiometers 32b, 32c and 32d are all set to full scale values. Product-variables provided by potentiometers 32b through 32e are normally of the same polarity since batteries 42b through 42e are all negatively connected relative to ground. Accordingly, to achieve a null, reciprocal switch 48e is transferred to its second position, thereby inverting the polarity of the fifth variable with respect to the second, third and fourth variables. Then, a null is achieved by adjusting balance potentiometer 54e. Fine adjustment is made with sensitivity switch 30 depressed, as before.

Balance of scale multiplier circuit 74 may be accomplished in essentially the same manner as that for fifth variable input circuit 34e. Here, input potentiometers 32a and 32e are both set at zero, and remaining potentiometers 32b, 32c, and 32d are set at full scale values. Arm 98 of scaling switch 88 is set to produce a maximum output voltage, i.e., on contact 92. Then, calibrating potentiometer 80 is adjusted to produce the required null.

At this time, the computer is ready for use. To solve Problem 1, it is simply necessary to set the desired values for the independent variables on potentiometers 32d and 32e. Because the scale for the variable $Q$, i.e., scale 106e, covers two decades, the exponent switch must be set at the $X^2$ position with arm 72 on contact 66. Potentiometers 32b and 32c are set to their zero or maximum counterclockwise positions. Potentiometer 32a provides the dependent variable. Since all of the independent variables enter into Problem 1 as multiplicative factors on the same side of the equation, all of the reciprocal switches are maintained in their normal position.

To obtain the solution, potentiometer 32a is adjusted to obtain a null reading on meter 24. If necessary, due to the particular values of the independent variables, multiplier switch 88 can be adjusted in order to expand the scale for the dependent variable so that meter 24 can be nulled. Once a null reading is achieved, and fine adjustment made with sensitivity switch 30 depressed, the problem has been solved for the particular set of input parameters chosen. The reading on scale 106a (or 110) provides the answer after multiplication by any scale factor used on multiplier circuit 74.

As will be appreciated, if it is desired to vary any one of the independent variables, the corresponding potentiometer is simply adjusted to the new value. The result is immediately reflected in a nonzero output meter reading. A return to the desired null may be achieved either by adjustment of dependent variable potentiometer 32a, or alternatively, the other independent variable potentiometer may be adjusted to compensate for the previous change, thereby placing in immediate view to the operator, the manner in which modification of one of the independent variables affects any or all of the other variables.

From the foregoing, it may be seen that a wide range of input variables may be handled and numerous classes of problems solved by the simple expedient of substituting a different parameter scale card bearing variables pertinent to the particular problem whose solution is desired. A wide variety of parameter scale cards may be prepared for distribution with the computer device. Among the cards which have been prepared are ones relating to heat gain and heat loss problems, hot water piping problems, lighting problems, electrical conduction problems, pump problems, beam stress problems, and beam deflection problems.

Actually, the number of problems that can be solved is limited only by the number of problem-variable potentiometers provided with the computer. Similarly, a wide range of functions, including exponential or trigonometric functions, can readily be represented simply by proper labeling and spacing of the dial scale indicia. Thus, a function such as $e^x$ may easily be represented by labeling the scale in appropriately spaced values of the independent variable X so that the resulting voltage produced by the problem-variable potentiometer will represent the function $e^x$. In like fashion, any other mathematical function which can be represented graphically, may serve as a problem variable with the computer simply by proper spacing and labeling of the indicia on a dial scale.

In view of the foregoing, it may be seen that the present invention provides a powerful and versatile computing tool in a relatively simple and straight-forward manner. All of the normal burdensome scale factor conversion and table look-up is obviated by proper arrangement of the dial scales with respect to each other so that convenient and rapid calculations may be made. The computer operation is similar to that of a slide rule but it is considerably more versatile. Conversion from the solution of one class of problems to another is extremely simple; the full versatility of this device may be obtained simply by changing the parameter scale cards.

In addition, there are a number of significant problems for which the interchangeable parameter scale cards permit a practical and convenient solution of equations involving a number of variables exceeding the capability of the machine. For such problems two or more cards are combined to achieve the desired problem solution. For example, with the five-variable computer disclosed herein, a problem involving up to nine variables may be solved on two cards, a problem involving up to 13 variables may be solved on three cards, etc.

For such operation, the variables are grouped for solution. On the first card, four variables are designated as independent problem variables as before, and the fifth variable constitutes a "dependent" variable for the portion of a problem represented on the first card. Computer operation proceeds by balancing the independent variables against the dependent variable as before, then the dependent variable is transferred to a second card as an "independent" variable. Here, one variable is designated as the dependent variable and the remaining variables serve with the transferred variable as independent variables.

Such transfer of variables between cards permits substantial expansion of the range of variables which can be handled. For example, use of a plurality of cards would facilitate solution of an equation involving an algebraic summation including a multivariable product or quotient term or, conversely, involving the multiplication or division of a multivariable algebraic addition. As will be appreciated, the addition would be accomplished on a card having linearly graduated scales of indicia while the multiplication and division would be accomplished on a card having logarithmic graduations. Constant parameter conversion factors could still be incorporated by scale rotation, i.e., by appropriate initial numerical designations on the related scales.

Another example is the case of an additive or multiplicative equation involving more than the number of variables provided on a single card. Numerous examples of these and similar problems arise commonly in engineering and other mathematical fields.

While the construction described above represents a preferred embodiment of the invention, it will be recognized that various modifications within the scope of the invention may be apparent. These would include provision of a larger or smaller number of input circuits, and/or different arrangements of the various input functions described. Other circuit modifications may also be contemplated. Also, means of providing removable and interchangeable parameter scaling card sets differing from the keyhole slotted cards described herein may be substituted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein:

What I claim and desire to be secured by United States Letters Patent is:

1. An electronic computing device for processing a plurality of different mathematical problem-variables to solve a large variety of different problems comprising: first signal generating means to generate a first group of electrical signals representing desired values of the independent problem variables in an equation to be solved; means for combining said first group of signals to produce an electrical analog representing the solution to the equation; second signal generating means to generate a further electrical signal representing trial values of the solution; means for comparing said electrical analog signal with said further electrical signal to provide an indication when the two signals are equal; and a set of separate and interchangeable parameter scaling means cooperating with said first and second generating means to provide identification for different variables, predetermined interrelationships between variables, and input and output scales associated with each of said variables for each member of said set of scaling means.

2. An electronic computing device as defined in claim 1 wherein said first and second generating means include a plurality of voltage sources, and a potentiometer associated with each voltage source; a separate voltage source and potentiometer being provided each of the independent problem-variables, and for the dependent problem-variable constituting the trial solution to the equation.

3. An electronic computing device as defined in claim 1 where each of said interchangeable parameter scaling means provides a dial scale for each of said problem-variable potentiometers; different members of said set providing dial scales with different variable identification and scale calibration.

4. An electronic computing device as defined in claim 2 wherein each of said interchangeable parameter scaling means comprises a card constructed of durable material, and including a plurality of problem-variable identifications and potentiometer dial scales contained thereon; means for mounting said card in removable relationship with shafts of said problem-variable potentiometers; pointer means associated with each of said potentiometer shafts and so positioned that when a removable scale card is in operable relationship with said potentiometers, each of said dial scales cooperates with the pointer means on one of said potentiometer shafts.

5. An electronic computing device as defined in claim 1 wherein said first and second generating means includes manual adjustment means and wherein each member of said set of scaling means includes a plurality of scales of indicia thereon bearing predetermined relationships to each other and so positioned with respect to each other as to establish said desired relationships; each of said scales of indicia cooperating with one of said manual adjusting means to provide a scale therefor permitting said manual adjusting means to be set at the desired values.

6. An electronic computing device as defined in claim 5 wherein said scales of indicia include numerical designations in logarithmically spaced relationship.

7. An electronic computing device as defined in claim 6 where at least one of said scales begins at an integral power of 10 and where at least one of the remaining scales begins at some nonintegral power of 10.

8. An electronic computing device as defined in claim 6 where at least one of said scales corresponding to a preselected dependent variable includes indicia and numerical designations covering more than one numerical decade; and wherein said computing means includes means for adjusting said second generating means to accommodate said multiple decade scale in relationship to the other single decade scales.

9. An electronic computing device as defined in claim 1 including a plurality of input circuits; one of said input circuits nominally corresponding to said second generating means; the remainder of said input circuits nominally corresponding to said first generating means; said input circuits each including a battery, a problem value setting potentiometer, and coupling means to produce a predetermined voltage less than said battery voltage across said problem-value setting potentiometer.

10. An electronic computing device as defined in claim 9 wherein said coupling means for said one input circuit is a fixed resistor, and said coupling means for the remainder of said coupling circuits are each variable resistors.

11. An electronic computing device as defined in claim 9 wherein the batteries in said input circuits are so connected that the voltage across said problem-variable setting potentiometer in said first input circuit is of opposite polarity to the voltage appearing across all of the remaining problem-variable setting potentiometers.

12. An electronic computing device as defined in claim 10 wherein at least one of said input circuits corresponding to said first generating means includes means to invert the polarity of the voltage across the associated problem-variable setting potentiometer.

13. An electronic computing device as defined in claim 1 wherein each member of said set of parameter scaling means comprises a card formed of durable material; a plurality of scales of indicia on said card, each of said scales being adapted to cooperate with one of said signal generating means; one or more of said scales nominally constituting dependent variable scales and remainder of said scales nominally constituting independent variable scales; each of said scales including numerical designations spaced on said scale in accordance with a predetermined functional relationship; and further indicia associated with each of said scales identifying each member of the group of variables represented by said card.

14. An electronic computing device as defined in claim 13 wherein the numerical designations on each of said scales are functionally interrelated in a predetermined manner to provide conversion and constant parameter interrelationships between dependent and independent variables.

15. An electronic computing device as defined in claim 14 wherein said first and second generating means comprise separate voltage sources and associated potentiometers for each problem-variable; wherein said scales on said card are positioned to cooperate with shafts extending from said potentiometers to provide dial scales for said potentiometers; and including pointer means associated with said potentiometer shaft and said dial scales to establish desired values for said problem variables; the interrelationship between problem variables being achieved by rotation of the indicia and numerical designations on said scales relative to each other so that a given potentiometer numerical setting will produce a potentiometer output voltage corresponding to the numerical setting multiplied by the desired conversion factor or constant.

16. An electronic computing device as defined in claim 15 wherein said card includes a plurality of openings so positioned relative to each other and said potentiometer shafts to permit said card to be positioned with said potentiometer shafts removably protruding through said openings.

17. An electronic computing device as defined in claim 1 wherein said comparing means comprises an operational amplifier having resistive feedback; a meter connected to the output of said amplifier; and a first summing resistor connected to said second generating means; and wherein said means for combining said first group of signals comprises a group of input summing resistors connecting said first signal generating means to said operational amplifier.

18. An electronic computing device as defined in claim 17 including input circuits constituting said first and second generating means, each of said input circuits including a voltage source and a potentiometer connected to said voltage source for producing a signal representing the desired value of one of the problem-variables; and means connecting each of said potentiometers to one of the input summing resistors for said amplifier.

19. An electronic computing device as defined in claim 18 further including scale multiplier means comprising an additional input summing resistor for said amplifier and means connected to said additional summing resistor to provide a fixed voltage input; the value of said voltage being an integral multiple of the full-scale voltage ordinarily provided by said problem variable potentiometers.